(12) United States Patent
Allgaeuer et al.

(10) Patent No.: US 10,654,336 B2
(45) Date of Patent: May 19, 2020

(54) HEATING SYSTEM, ELECTRIC OR HYBRID VEHICLE COMPRISING SUCH A HEATING SYSTEM AND METHOD FOR OPERATING A HEATING SYSTEM

(71) Applicant: Bayerische Motoren Werke Aktiengesellschaft, Munich (DE)

(72) Inventors: Christian Allgaeuer, Munich (DE); Nicolas Flahaut, Munich (DE); Markus Moser, Oberschleissheim (DE); Marion Mack, Munich (DE); Oliver Horn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 64 days.

(21) Appl. No.: 16/032,424

(22) Filed: Jul. 11, 2018

(65) Prior Publication Data

US 2018/0319246 A1 Nov. 8, 2018

Related U.S. Application Data

(63) Continuation of application No. PCT/EP2016/082331, filed on Dec. 22, 2016.

(30) Foreign Application Priority Data

Jan. 14, 2016 (DE) .......... 10 2016 200 362

(51) Int. Cl.
*B60H 1/00* (2006.01)
*B60H 1/14* (2006.01)
(Continued)

(52) U.S. Cl.
CPC ......... *B60H 1/00278* (2013.01); *B60H 1/143* (2013.01); *B60H 1/323* (2013.01);
(Continued)

(58) Field of Classification Search
CPC .... B60H 1/00278; B60H 1/143; B60H 1/323; B60H 2001/00307; H01M 10/613;
(Continued)

(56) References Cited

U.S. PATENT DOCUMENTS

| 5,333,678 A | * | 8/1994 | Mellum | ............. | B60H 1/00378 122/26 |
| 7,451,808 B2 | * | 11/2008 | Busse | ................. | B60H 1/00278 165/202 |

(Continued)

FOREIGN PATENT DOCUMENTS

| DE | 10 2008 012 705 A1 | 9/2009 |
| DE | 10 2010 048 853 A1 | 4/2012 |

(Continued)

OTHER PUBLICATIONS

International Search Report (PCT/ISA/210) issued in PCT Application No. PCT/EP2016/082331 dated Mar. 30, 2017 with English translation (six pages).

(Continued)

*Primary Examiner* — Jon T. Schermerhorn, Jr.
(74) *Attorney, Agent, or Firm* — Crowell & Moring LLP

(57) ABSTRACT

A heating system for an electric or hybrid vehicle, to which a high-voltage accumulator is connected, includes a coolant circuit having a heating circuit to which a heating heat exchanger is connected for air-conditioning the interior, and having a cooling circuit to which a cooler and a heat source are connected. The heating system has at least two refrigerating circuits, wherein a first refrigerating circuit includes an air-conditioning evaporator for air-conditioning the interior, and a first condenser, by which the first refrigerating circuit is thermally coupled to the coolant circuit in order to dissipate heat from the first refrigerating circuit. The second refrigerating circuit is thermally coupled by a second condenser to the coolant circuit. The two refrigerating circuits, (Continued)

however, are not coupled to each other. At least one of the refrigerating circuits further includes a chiller in order to dissipate heat from the coolant circuit.

17 Claims, 6 Drawing Sheets

(51) Int. Cl.
  *B60H 1/32* (2006.01)
  *H01M 10/625* (2014.01)
  *H01M 10/6569* (2014.01)
  *H01M 10/613* (2014.01)
  *H01M 10/663* (2014.01)
  *H01M 10/6568* (2014.01)
  *B60L 58/26* (2019.01)

(52) U.S. Cl.
  CPC ........... *B60L 58/26* (2019.02); *H01M 10/613* (2015.04); *H01M 10/625* (2015.04); *H01M 10/6568* (2015.04); *H01M 10/6569* (2015.04); *H01M 10/663* (2015.04); *B60H 2001/00307* (2013.01); *Y02T 10/705* (2013.01); *Y02T 10/7005* (2013.01)

(58) Field of Classification Search
  CPC ........... H01M 10/625; H01M 10/6568; H01M 10/6569; H01M 10/663; B60L 58/26
  See application file for complete search history.

(56) References Cited

U.S. PATENT DOCUMENTS

| | | | | |
|---|---|---|---|---|
| 7,789,176 B2* | 9/2010 | Zhou | ............... | B60H 1/00278 |
| | | | | 180/65.1 |
| 9,233,593 B2* | 1/2016 | Beschieru | .......... | B60H 1/00278 |
| 2005/0133215 A1* | 6/2005 | Ziehr | ................ | B60H 1/00392 |
| | | | | 165/202 |
| 2008/0295535 A1* | 12/2008 | Robinet | ............. | B60H 1/00278 |
| | | | | 62/259.2 |
| 2009/0130513 A1* | 5/2009 | Tsuchiya | ............ | B60H 1/00385 |
| | | | | 429/412 |
| 2012/0090806 A1 | 4/2012 | Beschieru et al. | | |
| 2018/0236842 A1* | 8/2018 | Allgaeuer | .......... | B60H 1/00392 |
| 2019/0275858 A1* | 9/2019 | Seki | ................... | B60H 1/00485 |

FOREIGN PATENT DOCUMENTS

| | | |
|---|---|---|
| DE | 10 2012 024 080 A1 | 3/2014 |
| DE | 10 2015 220 623 A1 | 4/2017 |
| EP | 2 520 452 A2 | 11/2012 |

OTHER PUBLICATIONS

German-language Written Opinion (PCT/ISA/237) issued in PCT Application No. PCT/EP2016/082331 dated Mar. 30, 2017 (six pages).

German-language Search Report issued in counterpart German Application No. 10 2016 200 362.3 dated Mar. 14, 2018 with partial English translation (10 pages).

* cited by examiner

HEATING SYSTEM, ELECTRIC OR HYBRID VEHICLE COMPRISING SUCH A HEATING SYSTEM AND METHOD FOR OPERATING A HEATING SYSTEM

CROSS REFERENCE TO RELATED APPLICATIONS

This application is a continuation of PCT International Application No. PCT/EP2016/082331, filed Dec. 22, 2016, which claims priority under 35 U.S.C. § 119 from German Patent Application No. 10 2016 200 362.3, filed Jan. 14, 2016, the entire disclosures of which are herein expressly incorporated by reference.

BACKGROUND AND SUMMARY OF THE INVENTION

The invention relates to a heating system for an electric or hybrid vehicle, to which a high-voltage accumulator is connected and which has a first refrigerating circuit and a coolant circuit, said coolant circuit having a heating circuit, to which a heating heat exchanger is connected, for air-conditioning the interior, and having a cooling circuit to which a cooler and a heat source are connected, wherein the first refrigerating circuit has an air-conditioning evaporator for air-conditioning the interior, and a first condenser, by which the first refrigerating circuit is thermally coupled to the coolant circuit, for discharging heat from the first refrigerating circuit. The invention furthermore relates to an electric or hybrid vehicle having such a heating system, and to a method for operating the heating system.

A corresponding heating system is described in the unpublished German patent application filed under no. 102015220623.8 by the Applicant.

A heating system serves primarily for air-conditioning various components of a vehicle, for example an interior, also referred to as the passenger compartment, an internal combustion engine, an electric drivetrain, a power electronics circuit, and/or a high-voltage accumulator for supplying power to the drivetrain. The respective component when in operation is then heated, cooled, or both, as required, by means of the heating system. In order for a specific air-conditioning output to be generated, for example for cooling the interior and/or the high-voltage accumulator, the heating system typically has a refrigerating circuit having a compressor, a condenser, an expansion member, and an evaporator. In specific cases, that is to say in the case of specific operational states of the vehicle, the air-conditioning output that is capable of being generated by the refrigerating circuit is however not sufficient for guaranteeing adequate cooling. Particularly in the context of an electric or hybrid vehicle which for propulsion has a high-voltage accumulator, high travel speeds and rapid charging of the high-voltage accumulator, for example, as operational states are critical in terms of cooling.

Against this background, it is an object of the invention to provide an improved heating system for air-conditioning an electric or hybrid vehicle, and such a vehicle and a method for operating the heating system. The heating system is to be constructed in as cost-effective a manner as possible and in particular from components which are available and suitable for automotive applications, particularly in terms of weight and installation space. Additionally, the operation of the heating system should be as efficient as possible and in acoustic terms as inconspicuous as possible under partial load as well as full load conditions.

The object is achieved according to the invention by a heating system, by an electric or hybrid vehicle having the heating system, and by a method of operating the heating system, in accordance with embodiments of the invention. Advantageous design embodiments, refinements, and variants are described and claimed herein. The explanations made in the context of the heating system herein apply in analogous manner also to the vehicle and to the method, and vice versa.

The heating system serves for air-conditioning various components of an electric or hybrid vehicle, which in the context of this application is also referred to for short merely as a vehicle. A high-voltage accumulator which primarily serves for supplying power to an electric drivetrain of the vehicle is connected to the heating system. To this end, the high-voltage accumulator, by means of a suitable heat exchanger, is thermally connected to the heating system for exchanging heat with the latter. The heating system has a first refrigerating circuit in which a refrigerant is compressed and conveyed in particular by way of a compressor.

The heating system furthermore has a coolant circuit, said coolant circuit having a heating circuit, to which a heating heat exchanger is connected, for air-conditioning the interior, and having a cooling circuit to which a cooler and a heat source are connected, wherein the first refrigerating circuit has an air-conditioning evaporator for air-conditioning the interior, and a first condenser, by which the first refrigerating circuit is thermally coupled to the coolant circuit, for discharging heat from the first refrigerating circuit. The condenser is coolant-cooled and is, for example, a water-cooled condenser, or alternatively a gas cooler in the case of the refrigerant being R744, for example.

Overall, the heating system is accordingly configured for heating, cooling, and in particular also de-humidifying the interior of the vehicle, more specifically air which is supplied to the interior, by way of the air-conditioning evaporator and the heating heat exchanger. The heating heat exchanger and the air-conditioning evaporator are thus in particular parts of an air-conditioning apparatus. For cooling, heat is extracted from the air by use of the air-conditioning evaporator, said heat making its way into the first refrigerating circuit. By contrast, for heating, heat is transferred from the first refrigerating circuit into the coolant circuit by way of the condenser, and coolant, which then is supplied to the heating heat exchanger, is heated on account thereof.

A second refrigerating circuit, which is separate in relation to the first refrigerating circuit, is disposed according to the invention, that is to say that the heating system has a second refrigerating circuit. Said second refrigerating circuit is hydraulically separated from the first refrigerating circuit, that is to say that there is no exchange of refrigerant between the two refrigerating circuits. The second refrigerating circuit has a second condenser and by means of the latter is thermally coupled to the coolant circuit, for discharging heat from the second refrigerating circuit. Separate is thus understood in particular to mean that the first and the second refrigerating circuits are not directly connected or coupled to one another, and therefore also cannot directly exchange refrigerant or heat with one another. However, both refrigerating circuits are thermally connected to the coolant circuit in order to exchange heat in each case with said coolant circuit. The linkage in thermal terms to the coolant circuit is performed at least by way of the respective condenser by way of which heat is transferred from the respective refrigerating circuit to the coolant circuit.

Furthermore, at least one of the refrigerating circuits has a chiller for discharging heat from the coolant circuit. The chiller also represents a thermal connection of the respective refrigerating circuit to the coolant circuit, but the heat here is transported in the opposite direction as compared to the condenser, specifically from the coolant circuit to the refrigerating circuit. On account thereof, in cooling operation, heat which is generated by a component, in particular by the heat source, in the coolant circuit is discharged by way of the chiller, the component being cooled in this way. The heat that is absorbed into the refrigerating circuit is then, in particular in a heat-pump operation, supplied back to the coolant circuit at another location by way of the condenser, expediently to the heating circuit for the purpose of heating the interior. The refrigerating circuit having the chiller and the condenser is thus in particular a heat pump. Alternatively or additionally to the discharge of heat by way of the chiller, heat is discharged by way of the cooler. By virtue of the separate design embodiment of the refrigerating circuits, the condensers and the chiller are in each case assigned to only one refrigerating circuit, yet are all connected to the coolant circuit.

The invention is based in particular on the concept that simple scaling of an individual refrigerating circuit in terms of the air-conditioning output has certain disadvantages and above all requires a larger compressor with a higher output, this leading to a higher diversity in terms of components in the construction of different vehicles having different requirements in terms of the maximum air-conditioning output. Further disadvantages of a larger compressor are, in particular, high development costs; a larger installation space required; the requirement of pulsing in operation under partial load, that is to say in the case of a low requirement in terms of refrigerating output, this being critical in terms of acoustics and the recirculation of oil, in the case of a scroll compressor, for example, due to a minimum number of revolutions; and the requirement of adapting refrigerant lines and connection technology, in particular due to the higher mass flows of refrigerant.

By contrast, in the case of the layout according to the invention of the heating system, having a plurality of separate refrigerating circuits, components that are already available for the various refrigerating circuits are advantageously installed, in particular the same compressor is in each case installed in the plurality of refrigerating circuits. Overall, scaling the output by way of already proven and available components in the context of a particularly simple modular component concept is thus possible in a simple manner. An existing modular component concept does not have to be expanded, in particular. Furthermore, compressors of appropriately small dimensions are advantageously used, said compressors in this instance in each case only partially contributing toward the entire maximum air-conditioning output of the heating system.

An essential basic concept of the invention thus consists in particular in that a plurality of refrigerating circuits are used in a heating system in order for the output of the heating system to be increased. A particular advantage of such a heating system in this instance lies in particular also in that the various refrigerating circuits can assume different air-conditioning tasks in that the refrigerating circuits are thermally connected to the coolant circuit at different locations of the latter. One air-conditioning task, for example, is the cooling of a specific component and/or the discharging of heat by way of a specific component of the heating system. Overall, a plurality of switching arrangements of the refrigerating circuits and the coolant circuit are contemplated herein, a few preferred design embodiments of said switching arrangements being described further below. A flexible switching arrangement of this kind is not possible in the case of a simple scaling of an individual refrigerating circuit. By contrast, in the case of a plurality of refrigerating circuits being used, a number of air-conditioning tasks are expediently assigned individually to each refrigerating circuit. In particular, a respective refrigerating circuit is switched off or additionally switched on, that is to say activated or deactivated, depending on the operating mode of the heating system and depending on the required output. By virtue of the separate, and in particular separately switchable, refrigerating circuits, the heating system is thus particularly efficient in operation. In order for the refrigerating circuits to be switched, the heating system in this instance expediently has a control unit, also referred to as a controller, or is connected to a control unit of the vehicle. The control unit alternatively or additionally also serves for switching the heating system between various operating modes.

The coolant circuit is conceived in particular as an integrated coolant circuit in which a plurality of circuits, specifically at least the cooling circuit and the heating circuit, are in principle interconnected hydraulically, that is to say in terms of fluid technology, by way of a number of lines such that an exchange of coolant between various ones of the circuits is performed or suppressed, depending on the operating mode of the heating system. The circuits can be separated from one another in particular by way of a suitable switching arrangement among the circuits, for example by means of suitable valves. Separated in this instance is in particular understood to mean that the respective circuit is merely shut off, in particular by means of a suitable valve, such that no exchange of coolant is performed between the separated circuit and the remaining circuits. Alternatively, however, the circuits are configured so as to be separate from one another and are not interconnected in terms of fluid technology. This is possible and expedient, for example, in the case of a hybrid vehicle having a high-temperature cooling circuit and a low-temperature cooling circuit which is permanently separated therefrom.

In one preferred design embodiment, the heating system is based on the coolant circuit described in the German application 102015220623.8 mentioned at the outset and explained in more detail in the context of FIG. 1 therein. In terms of the operation and the operating modes of such a heating system, reference is likewise made to said application. However, in principle, the invention can also be advantageously applied to other heating systems and switching arrangements.

The coolant circuit in the integrated design embodiment preferably has, downstream of the cooler, a heating circuit supply flow which connects the cooling circuit to the heating circuit. The heating circuit in this instance is likewise connected to the cooling circuit upstream of the cooler by way of heating circuit return flow. The heating circuit is moreover connected in parallel with the heat source, that is to say that coolant which emanates from the cooler is distributed between the heating circuit and the heat source.

The heat source is in particular an electric drivetrain of the vehicle, an electronic charging circuit for the high-voltage accumulator, a power electronics circuit, or, in the case of a hybrid vehicle, an internal combustion engine, for example.

In one advantageous design embodiment, there is moreover disposed in the heating circuit a booster heater, for example an electric flow-type heater, by which a heating boost is performed on demand in the case of the heat that is input into the heating circuit by the condensers not being sufficient in order for a respective air-conditioning requirement, here in particular a heating requirement in terms of the interior, to be adequately met.

For an increase in efficiency, a number of the refrigerating circuits, preferably each refrigerating circuit, advantageously has an internal heat exchanger.

There are a number of possibilities for arranging the condensers relative to the coolant circuit; however, the condensers are preferably disposed in the heating circuit, one or both condensers serving for supplying heat to the heating heat exchanger. To this end, the condenser or both condensers is/are disposed in the heating circuit upstream of the heating heat exchanger.

In the case of an interior heating not being required and/or in the case of more heat being available in the heating circuit than is required for heating, said heat is advantageously supplied to the cooling circuit by way of the heating circuit return flow and ultimately dissipated to the environment, for example by way of the cooler.

There are also a number of connection possibilities for the chiller; however, the chiller is preferably disposed in the cooling circuit downstream of the heat source and upstream of the cooler, so as to efficiently absorb heat from the heat source before said heat is supplied to the cooler. The chiller is in particular also disposed upstream of the heating circuit return flow, that is to say disposed parallel to the heating circuit, such that in the distribution of the coolant flow between the heating circuit and the heat source the chiller is also perfused by only part of the coolant, specifically that part that is not routed to the heating circuit.

The two condensers are expediently disposed so as to be in mutual spatial proximity, in order for the overall heating circuit to be designed in as compact a manner as possible. However, there are a plurality of suitable variants in terms of the mutual arrangement of the condensers when it comes to the details.

In a first suitable variant, the condensers are connected in parallel and are connected to the heating circuit upstream of the heating heat exchanger. The heating circuit herein, downstream of the heating circuit supply flow, is split into two condenser branches which are unified again downstream of the condensers and still upstream of the heating heat exchanger. This hereafter is also referred to as a true parallel connection, since both condensers herein are used, as it were, in an equivalent manner, the heating heat exchanger being supplied with the coolant that has potentially been heated by both condensers.

In a second suitable variant, one of the condensers is connected to the heating circuit upstream of the heating heat exchanger, and the other condenser is connected in an HHE bypass, that is to say a heating heat exchanger (HHE) bypass, for bypassing the heating heat exchanger. This is also referred to as a dummy parallel connection since the condensers herein are not used in the same manner, the heated coolant of the one condenser instead first being guided past the heating heat exchanger. As in the case of the true parallel connection, the heating circuit, downstream of the heating circuit supply flow, is first split into two condenser branches which, however, are now not unified again upstream of the heating heat exchanger but only downstream of the latter. Accordingly, the heating heat exchanger, conjointly with one of the condensers, is disposed in one of the condenser branches, the other condenser being disposed in the HHE bypass, that is to say in particular also parallel to the heating heat exchanger. This is particularly worthwhile in the case of the two condensers not transmitting heat at the same time, for example in an operating mode in which only one of the refrigerating circuits is active and only one of the condensers transmits heat. Part of the coolant in this instance flows through the HHE bypass and is not heated, thus being cold coolant which is advantageously guided past the heating heat exchanger, on account of which a decrease in the temperature at the heating heat exchanger is advantageously avoided.

In the case of a closed heating circuit, that is to say a heating circuit that is separated from the cooling circuit, a coolant return is in particular performed, such that coolant from the HHE bypass is also supplied indirectly to the heating heat exchanger in this instance. Otherwise, however, in the case of the dummy parallel connection it is in principle possible for heat by way of the HHE bypass to be guided past the heating heat exchanger and directly to the cooler.

In a third suitable variant, the condensers are connected in sequence and are connected to the heating circuit upstream of the heating heat exchanger, that is to say are disposed in series. This is particularly worthwhile in the case of the two condensers not transmitting heat at the same time, for example in an operating mode in which only one of the refrigerating circuits is active, and only one of the condensers transmits heat.

In general, as compared with a parallel connection, only part of the volumetric coolant flow, in particular half the volumetric coolant flow, has to be provided by a pump for conveying the coolant, in particular a heating circuit pump, which is disposed in the heating circuit, in order for both condensers to be impinged upon with comparable volumetric coolant flows. In the case of the serial connection, the output of the downstream condenser is disadvantageously decreased in certain circumstances in that the condenser that is perfused first, in the case of the latter being active, already heats the coolant and, on account thereof, elevates the coolant entry temperature of the downstream condenser, this leading to disadvantages in terms of the output and the efficiency of the respective refrigerating circuit.

In one variant, the heating system by means of suitable valves is switched on demand between a serial connection and a parallel connection of the condensers.

The chiller in a first suitable design embodiment is connected to the first refrigerating circuit, and an HVA evaporator is connected to the second refrigerating circuit, for cooling the high-voltage accumulator (HVA). In this design embodiment, the high-voltage accumulator is accordingly not coolant-cooled but refrigerant-cooled. The HVA evaporator herein is in particular not a chiller. The refrigerating circuits in this design embodiment in particular thus fulfill different air-conditioning tasks. The first refrigerating circuit in heat-pump operation of the heating system accordingly serves as a heat pump for transmitting exhaust heat of the heat source to the heating heat exchanger by means of the chiller and of the first condenser, and thus for heating the interior. Since the air-conditioning evaporator is also connected to the first refrigerating circuit, the latter also serves for cooling the interior and thus for the overall air-conditioning of the interior as an air-conditioning task. By contrast, the second refrigerating circuit serves primarily for cooling the high-voltage accumulator, that is to say for HVA cooling, in particular in HVA cooling operation of the heating system.

The second refrigerating circuit, in the case of a serial connection of the condensers, in this instance also contributes toward the heating of the interior in the case of HVA cooling operation being active. Since experience shows that cooling of the high-voltage accumulator is not permanently required at least at low external temperatures, the second condenser, in the case of the refrigerant-cooled high-voltage accumulator, is expediently disposed in the HHE bypass in the context of a dummy parallel connection. On account thereof, permanent heating of the interior by way of the heat pump is possible and also expediently implemented in heat-pump operation, without the supply flow temperature of the heating heat exchanger being lowered by way of the condenser that in the case of inactive HVA cooling operation is accordingly inactive.

In one advantageous refinement of the design embodiment having the refrigerant-cooled high-voltage accumulator, for improved cooling of said accumulator an additional HVA evaporator which is connected to the first refrigerating circuit is disposed such that the high-voltage accumulator is connected to both refrigerating circuits. The air-conditioning task of HVA cooling is in this instance assumed by both refrigerating circuits which, however, do not mandatorily have to be active at the same time but rather are combined on demand in the context of a demand-adapted air-conditioning. In the case of a dummy parallel connection of the condensers, the first refrigerating circuit having the chiller is advantageously disposed upstream of the heating heat exchanger, since said circuit primarily handles the heating of the interior.

In a second suitable design embodiment, the chiller is connected to the second refrigerating circuit, and the coolant circuit has an HVA circuit to which the high-voltage accumulator and the chiller are connected, wherein the chiller is disposed downstream of the high-voltage accumulator. By contrast to the first design embodiment mentioned above, the high-voltage accumulator in this second design embodiment is now coolant-cooled and by means of a suitable heat exchanger is thermally connected to the coolant circuit. The chiller in this instance serves for discharging exhaust heat of the high-voltage accumulator into the second refrigerating circuit and to this end is expediently disposed in the HVA circuit.

The HVA circuit is preferably integrated in the coolant circuit conjointly with the cooling circuit and with the heating circuit. The HVA circuit by means of a suitable switching arrangement, for example by means of appropriate valves, is operable in a separate manner, in particular in HVA cooling operation in which coolant in this instance circulates in the HVA circuit but is not exchanged with the other circuits. Heat from the HVA circuit in this instance is discharged by way of the chiller and used on demand for heating the interior, for example.

The HVA circuit is moreover expediently connected in parallel with the heating circuit and also in parallel with the heat source, that is to say that the coolant flow downstream of the cooler is splitable into three parts, specifically one part in the direction of the heating circuit, one part in the direction of the HVA circuit, and one part in the direction of the heat source. To this end, the HVA circuit by way of an HVA supply flow and of an HVA return flow is connected to the cooling circuit. The chiller is now preferably disposed both downstream of the high-voltage accumulator as well as downstream of the heat source in order to discharge exhaust heat of the high-voltage accumulator and/or of the heat source by way of the second refrigerating circuit as required. In particular in the case of an arrangement of the chiller in the HVA circuit, said chiller and the cooling circuit are expediently connected by way of an additional cross connection by way of which a diversion of coolant is also implemented from the high-voltage accumulator as well as from the heat source, while bypassing the chiller.

In a third suitable design embodiment, in each case one chiller is connected to each of the refrigerating circuits, specifically a first chiller to the first refrigerating circuit, and a second chiller to the second refrigerating circuit, and the coolant circuit has an HVA circuit to which the high-voltage accumulator and the two chillers are connected, wherein the two chillers each are disposed downstream of the high-voltage accumulator. A particularly flexible and efficient distribution of heat by means of the heating system is implemented by using a plurality of chillers. As is the case also with the two condensers, different possibilities in terms of mutual switching arrangements of the chillers also result accordingly in particular accordingly in this instance. Preferred variants result in particular in a manner analogous to the variants mentioned above in the context of the condensers. In particular, the chillers are also expediently disposed in spatial proximity to one another, and are both preferably disposed in the HVA circuit.

In a first advantageous variant, the two chillers are thus connected in sequence, that is to say connected in series. The advantages, in particular in terms of the volumetric flow, are derived in an analogous manner from the above explanations in terms of the condensers.

In a second advantageous variant, the two chillers are connected in parallel. It is a particular advantage herein that the chillers in terms of the coolant have the same supply flow temperature and thus also have a better heat transmission.

The aforementioned parallel connection is in particular a true parallel connection in which the HVA circuit downstream of the high-voltage accumulator is split into two chiller branches which are unified again downstream of the chillers and in particular still upstream of the HVA return flow. By contrast, a dummy parallel connection, in which one of the chillers, in particular the first chiller, is disposed downstream of the high-voltage accumulator as well as downstream of the heat source, and the other chiller, in particular the second chiller, is disposed downstream of the high-voltage accumulator and parallel to the heat source, is implemented in a third suitable variant.

This dummy parallel connection is expediently implemented by way of a shut-off device, preferably a check valve, which is disposed downstream of the high-voltage accumulator in the HVA circuit. The shut-off device herein is positioned only on one of the two chiller branches such that the other chiller branch is a bypass for the check valve and only one of the chillers is perfused by the coolant of the heat source, the exhaust heat of the latter in this instance being transmitted to the associated refrigerating circuit. The other chiller in this instance can no longer be perfused by coolant which flows from the heat source, and in particular by way of the cross connection, to the HVA circuit, wherein the cross connection is connected downstream of the shut-off device and upstream of the first chiller to the HVA circuit. This chiller thus serves only for discharging heat from the high-voltage accumulator.

The second chiller is preferably disposed parallel to the shut-off device, and the first chiller is preferably disposed downstream of the latter. The cooling of the high-voltage accumulator in this instance is an air-conditioning task of both refrigerating circuits, the cooling of the heat source, however, being an air-conditioning task of only the first refrigerating circuit. If no cooling or only minor cooling of the high-voltage accumulator is required, the second refrigerating circuit in an expedient design embodiment is deactivated, and the first refrigerating circuit, which in particular assumes all of the air-conditioning tasks, is exclusively used.

The second refrigerating circuit is additionally switched on in the case of an increased cooling requirement in the HVA circuit.

The heating system described is particularly suitable for an electric or hybrid vehicle having a high-voltage accumulator for supplying power to an electric drivetrain of the vehicle. The heating system in this instance is advantageously configured for air-conditioning the interior as well as for air-conditioning the high-voltage accumulator, and has at least two refrigerating circuits which are hydraulically separated from one another, and a common coolant circuit, which is thermally coupled to the refrigerating circuits, for exchanging heat with said refrigerating circuits.

In one preferred design embodiment, the vehicle has a plurality of operating states, specifically at least one normal operating state and one special operating state, wherein a higher air-conditioning requirement, for example a higher cooling requirement in terms of the high-voltage accumulator, is present in the latter. In particular, the vehicle has, as a special operating state, driving operation at high speed, or rapid charging operation for rapidly charging the high-voltage accumulator.

In the case of an advantageous method for operating the heating system described, each of the refrigerating circuits is assigned a number of air-conditioning tasks having in each case one air-conditioning requirement, and the refrigerating circuits are activated or deactivated independently of one another, in particular by means of a control unit, in order for the respective air-conditioning requirement to be met. An air-conditioning task is composed in particular of heating and/or cooling a component which for exchanging heat is connected to the heating system. Examples of air-conditioning tasks are heating of the interior, cooling of the interior, HVA cooling, optionally HVA heating, or cooling of the heat source. An air-conditioning requirement in this instance is the concrete requirement for a specific output for fulfilling the corresponding air-conditioning task.

The air-conditioning requirement is specified and predefined in particular by the control unit which is also referred to as the controller. The control unit is part of the heating system, for example, or alternatively is part of an onboard computer of the vehicle. A respective refrigerating circuit of the heating system is activated on demand by means of the control unit in the case of an air-conditioning requirement that is associated with the air-conditioning task of the respective refrigerating circuit being present. Either only one air-conditioning task is assigned to one specific refrigerating circuit herein, or a plurality of air-conditioning tasks are assigned to the latter such that the air-conditioning output of said specific refrigerating circuit is in particular also used for meeting a plurality of air-conditioning requirements at the same time. Conversely, a specific air-conditioning task is met either by only one of the refrigerating circuits or by a plurality of refrigerating circuits.

The assignment that is preferable in a concrete case herein depends in particular on the concrete switching arrangement of the heating system, on the operating modes of the latter, and/or on the potential operating states of the vehicle. In one exemplary design embodiment, two refrigerating circuits are present in this instance, of which the one refrigerating circuit is in principle activated in the case of all air-conditioning tasks that arise, wherein the other refrigerating circuit is used only for cooling the high-voltage accumulator, for example, and is only additionally activated in the case of the air-conditioning output required for the cooling not being able to be achieved by the one refrigerating circuit alone. The other refrigerating circuit here is used as an auxiliary apparatus, so to speak. Alternatively or additionally, by contrast, a division of labor is implemented in which at least one air-conditioning task which is not assigned to any other of the refrigerating circuits is assigned to each of the refrigerating circuits. As a modification of the aforementioned example, the high-voltage accumulator is cooled by only the other refrigerating circuit, for example and not by both refrigerating circuits.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
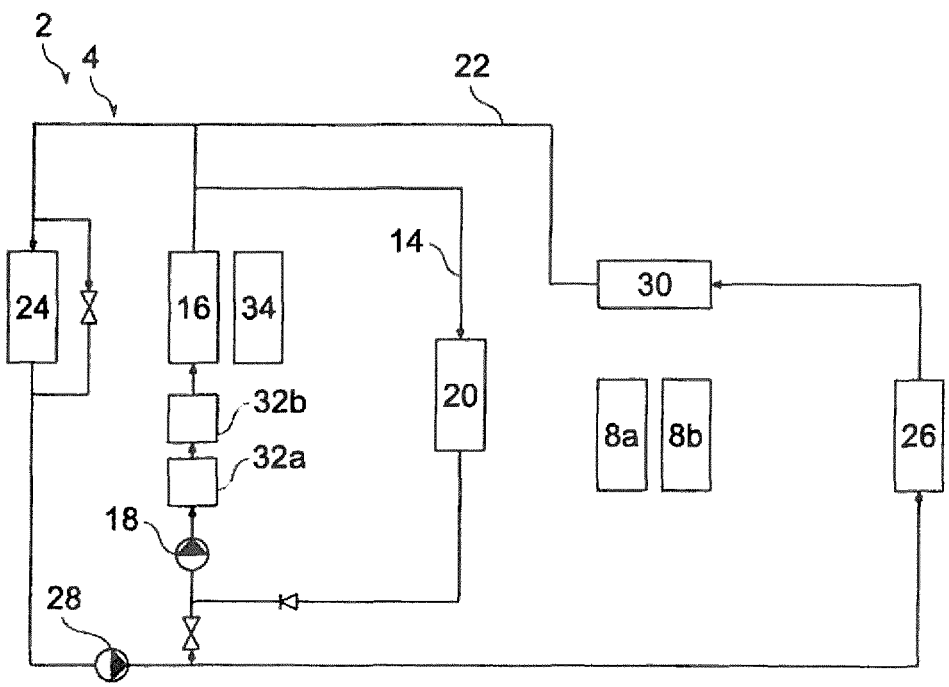
FIGS. 1 to 7 show a coolant circuit of in each case one variant of a heating system.
Figure 2:
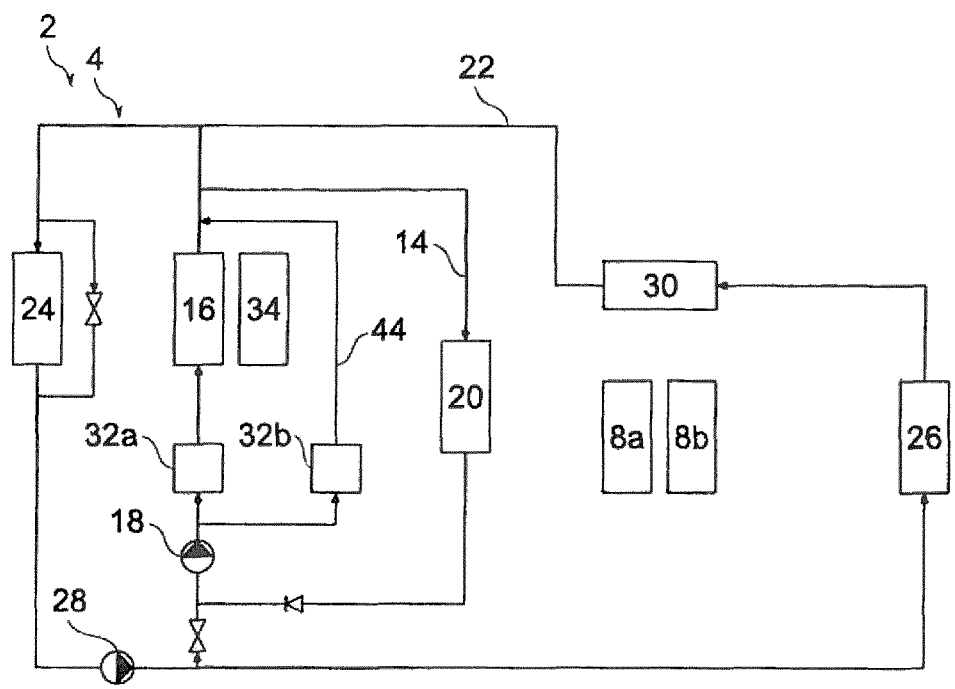
Figure 3:
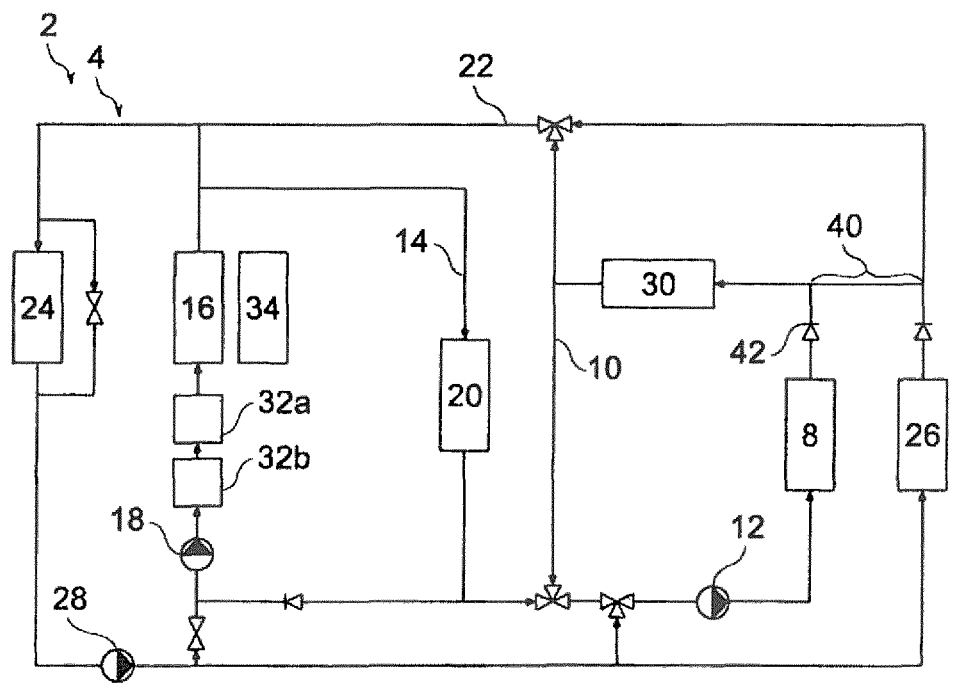

In each case one preferred exemplary embodiment of a heating system 2 for a vehicle (not illustrated in more detail) is illustrated in FIGS. 1 to 7. In the figures mentioned, only a coolant circuit 4 as well as selected components of associated refrigerating circuits 6a, 6b are initially shown, while preferred variants for a first refrigerating circuit 6a and for a second refrigerating circuit 6b of the heating system 2 are shown in the other figures, FIGS. 8A to 10B. FIGS. 8A, 8B, thus show two refrigerating circuits 6a, 6b for the heating systems 2 according to FIGS. 1 and 2, FIGS. 9A, 9B show two refrigerating circuits 6a, 6b for the heating system 2 according to FIG. 3, and FIGS. 10A, 10B show two refrigerating circuits 6a, 6b for the heating systems 2 according to FIGS. 4 to 7.

All of the variants shown of the heating system 2 serve for air-conditioning various components of the vehicle, said components being thermally connected to the heating system 2 by way of suitable heat exchangers, for discharging or absorbing heat.

The vehicle is an electric or hybrid vehicle, having a high-voltage accumulator 8 which for the purpose of air-conditioning, in FIGS. 1 and 2, by means of in each case one HVA evaporator 8a, 8b, is connected to in each case one of the refrigerating circuits 6a, 6b, that is to say is refrigerant-cooled. By contrast the high-voltage accumulator 8 in FIGS. 3 to 7 is connected to the coolant circuit 4, that is to say is coolant-cooled, and to this end is connected first to an HVA circuit 10 which in this instance is part of the coolant circuit 4 and is not present in the embodiment variant according to FIG. 1. In order for coolant to be recirculated in the HVA circuit 10, an HVA circuit pump 12 is additionally disposed in said circuit.

Furthermore, a heating circuit 14, which for heating the interior has a heating heat exchanger 16, is integrated in the coolant circuit 4 in all variants. Moreover, a heating circuit pump 18 and an additional booster heater 20 which is, for example, an electric flow-type heater, are disposed in the heating circuit 14. In addition to the heating circuit 14 and, optionally, to the HVA circuit 10, the heating system 2 also has a cooling circuit 22 in which a cooler 24 and a heat source 26 are disposed. The heat source 26 is, for example, an electric drivetrain or an electronic charging circuit or power electronics circuit of the vehicle. A cooling circuit pump 28 is disposed in the cooling circuit 22 for recirculating coolant.

Furthermore, only one chiller 30, and a first condenser 32a and a second condenser 32b, are connected to the coolant circuit 4 in FIGS. 1 to 3. By contrast, a first chiller 30a and a second chiller 30b are disposed in the variants of FIGS. 4 to 7. A respective chiller 30, 30a, 30b acts as an evaporator in the refrigerating circuit 6, serving in an overall manner for transmitting heat from the coolant circuit 4 to the respective refrigerating circuit 6a, 6b, to which the chiller 30, 30a, 30b is connected. A respective one of the condensers 32a, 32b in this instance serves for transmitting heat from the respective refrigerating circuit 6a, 6b to the coolant circuit 4. The chiller 30, 30a, 30b in the HVA circuit 10 in FIGS. 4 to 7 is in principle connected downstream of the high-voltage accumulator 8, the chiller 30 in FIGS. 1 to 3 being connected downstream of the heat source 26. The condensers 32a, 32b are connected in the heating circuit 14.

The first refrigerating circuit 6a in all variants furthermore has an air-conditioning evaporator 34 which serves for cooling the interior. The heating heat exchanger 16 and the air-conditioning evaporator 34 in this instance are in each case a component part of an air-conditioning apparatus (not referred to in more detail) for air-conditioning the interior. In each case one expansion member (not referred to in more detail) is disposed upstream of the air-conditioning evaporator 34 and of a respective chiller 30, 30a, 30b. Furthermore, each refrigerating circuit 6a, 6b has in each case one compressor 36a, 36b for compressing the refrigerant prior to the latter entering the respective condenser 32a, 32b. Moreover, in the embodiment shown here, in each case one internal heat exchanger 38a, 38b is integrated in the refrigerating circuits 6a, 6b for increasing the efficiency and the output.

The various circuits 10, 14, 22 of the coolant circuit 4 in the variants shown are hydraulically intercoupled and are capable of being shut off by means of valves (not referred to in more detail) and are then capable of being separately operated, depending on the operating mode. A particular aspect of the switching arrangement shown is the cross connection 40 between the HVA circuit 10 and the cooling circuit 22 in FIGS. 4 to 7. Furthermore, a shut-off device 42 in the form of a check valve is disposed downstream of the high-voltage accumulator 8 in FIGS. 4 to 7, in order to prevent a backflow of coolant which flows from the heat source 26 in the direction of the chiller 30 or of the chillers 30a, 30b in the HVA circuit 10. In terms of these aspects, and in terms of the valves and lines that are not referred to in more detail in the figures, and in terms of the function of said valves and lines, as well as in terms of the operating modes of the heating system 2 that are not discussed in more detail here, reference is made to the German application 10 2015 220 623.8 mentioned at the outset.

In particular, it is a core concept of all variants shown that a plurality of refrigerating circuits 6a, 6b are used in order to achieve a higher air-conditioning output as compared with an individual refrigerating circuit, without having to use a larger compressor. The two refrigerating circuits 6a, 6b herein are separate from one another and are capable of being operated in a mutually independent manner. The two refrigerating circuits 6a, 6b can thus assume different air-conditioning tasks and/or collectively meet an air-conditioning task having a correspondingly high demand in output. The arrangement of the condensers 32a, 32b and of the chillers 30, 30a, 30b in the coolant circuit is of particular significance herein, in particular the mutual arrangement of the condensers 32a, 32b and the mutual arrangement of the chillers 30a, 30b. To this end, FIGS. 1 to 7 show various preferred variants, the substantial features and mutual differences thereof being described hereafter. Further preferred variants are moreover derived from the combination of these variants.

The variants of FIGS. 1 and 2 differ only in the mutual arrangement of the two condensers 32a, 32b. FIG. 1 shows a serial connection in which the condensers 32a, 32b are sequentially connected. This is particularly worthwhile in the case of both condensers 32a, 32b not transmitting heat at the same time, for example in an operating mode in which only one of the refrigerating circuits 6a, 6b is active and only one of the condensers 32a, 32b transmits heat, the reciprocal disadvantageous influence in terms of the temperature of the coolant supply flow thus being eliminated.

In general, as compared to a parallel connection, only half the volumetric coolant flow has to be provided by the heating circuit pump 18 in order for both condensers 32a, 32b to be impinged with comparable volumetric coolant flows.

By contrast, the condensers 32a, 32b in FIG. 2 are connected in parallel, wherein one of the condensers 32a, 32b, here the second condenser 32b, is disposed on a HHE bypass 44 which resupplies the coolant only downstream of the heating heat exchanger 16. By virtue of this circumvention of the heating heat exchanger 16, the parallel connection shown in FIG. 2 is also referred to as a dummy parallel connection since the heating that is input into the heating circuit 14 by way of the second condenser 32b is not directly available for heating the interior. It is possible for this heat to be supplied at least indirectly to the heating heat exchanger 16 only by shutting off the heating circuit 14 and by returning the coolant. In general, it is an advantage of a parallel connection that in simultaneous operation of the refrigerating circuits 6a, 6b both condensers 32a, 32b have the same supply flow temperature which is the lowest possible and are thus operated in a manner that is as efficient as possible with as high an output as possible. In this instance, it is an advantage specifically of the dummy parallel connection shown here that an optimal heating of the interior is furthermore guaranteed even in the case of an inactive second refrigerating circuit 6b, since the coolant that has not been heated downstream of the second condenser 32b is specifically not added to the mixture already upstream of the heating heat exchanger 16.

FIGS. 8A, B show a first and a second refrigerating circuit 6a, 6b, respectively, for the variants of FIGS. 1 and 2. The division of labor between the refrigerating circuits 6a, 6b, which assume different air-conditioning tasks, becomes evident herein. Cooling of the interior is thus performed exclusively by means of the first refrigerating circuit 6a to which the air-conditioning evaporator 34 is connected. Heating of the interior is also implemented, in the case of a deactivated cooling of the high-voltage accumulator 8, that is to say in the absence of HVA cooling, only by way of the first refrigerating circuit 6a, specifically by heat-pump operation while using the chiller 30 and the first condenser 32a. However, exhaust heat of the high-voltage accumulator 8 is also available in the case of an activated HVA cooling. Depending on how intensely said high-voltage accumulator 8 is to be cooled, either only one of the refrigerating circuits 6a, 6b is activated, or both refrigerating circuits 6a, 6b are activated. Accordingly, the air-conditioning task of HVA cooling can be assumed by both refrigerating circuits 6a, 6b.

FIG. 3 likewise shows a variant having only one chiller 30, this variant albeit having a coolant-cooled high-voltage accumulator 8 which by way of an HVA circuit 10 is integrated in the coolant circuit 4. The chiller 30 is disposed in the HVA circuit 10 and in the special switching arrangement shown here can be used for discharging heat from the high-voltage accumulator 8 as well as from the heat source 26. This in principle applies also to the remaining variants of FIGS. 4 to 7, and therein at least to the first chiller 30a.

Figure 9A:
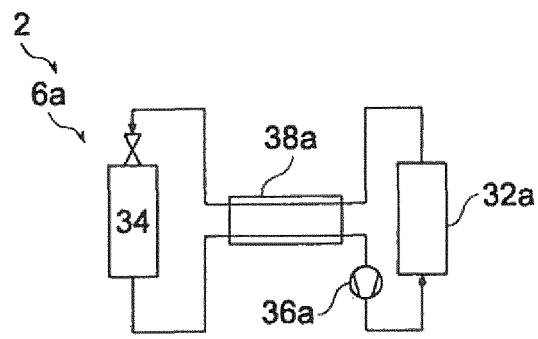
FIGS. 9A, 9B show a first and a second refrigerating circuit, respectively, for a heating system according to FIG. 3.
Figure 9B:
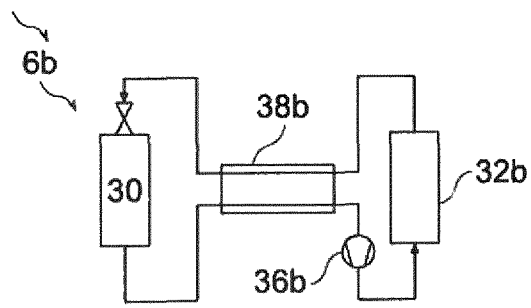
Figure 10A:
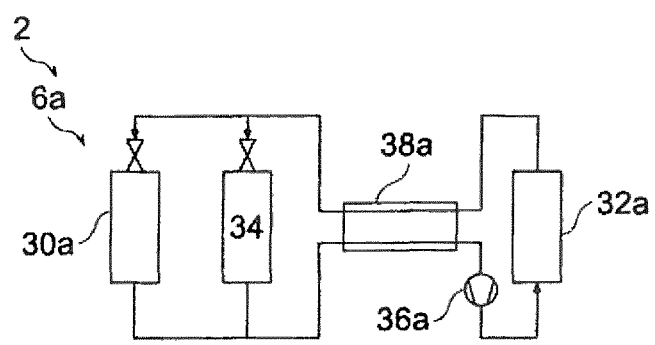
FIGS. 10A, 10B show a first and a second refrigerating circuit respectively for a heating system according to FIGS. 4 to 7.
Figure 10B:
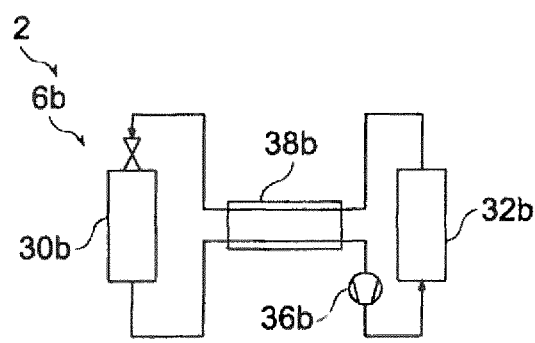

When combined with the refrigerating circuits 6a, 6b of FIGS. 9A, B it becomes evident that a division of labor between the refrigerating circuits 6a, 6b is implemented in the variant of FIG. 3. The first refrigerating circuit 6a is thus used only for cooling the interior, wherein heat can be returned again on demand by way of the first condenser 32a, for example in the context of de-humidifying operation. By contrast, the second refrigerating circuit 6b is used for cooling the high-voltage accumulator 8 and/or the heat source 26, and in heat-pump operation enables transmission of the exhaust heat of said components by way of the chiller 30 to the heating circuit 14 for the purpose of heating the interior.

The condensers 32a, 32b in FIG. 3 are shown in a serial connection. However, a dummy parallel connection according to FIG. 2 is also suitable, wherein in this instance however, as opposed to the illustration in FIG. 2, the first condenser 32a, and not the second condenser 32b as in FIG. 2, is expediently disposed on the HHE bypass 44.

FIGS. 4 to 7 now show variants of the heating system 2, in which in each case two chillers 30a, 30b are present, specifically a first chiller 30a which is connected to the first refrigerating circuit 6a, and a second chiller 30b which is connected to the second refrigerating circuit 6b. Suitable refrigerating circuits 6a, 6b for these variants are shown in FIGS. 10a and 10b, respectively. A dissimilar distribution of the air-conditioning tasks in the case of identical refrigerating circuits 6a, 6b is derived exclusively by virtue of the arrangement of the condensers 32a, 32b and of the chillers 30a, 30b, in the coolant circuit 4. The air-conditioning evaporator 34 herein in all variants is connected to the first refrigerating circuit 6a which accordingly serves for cooling the interior.

Figure 4:
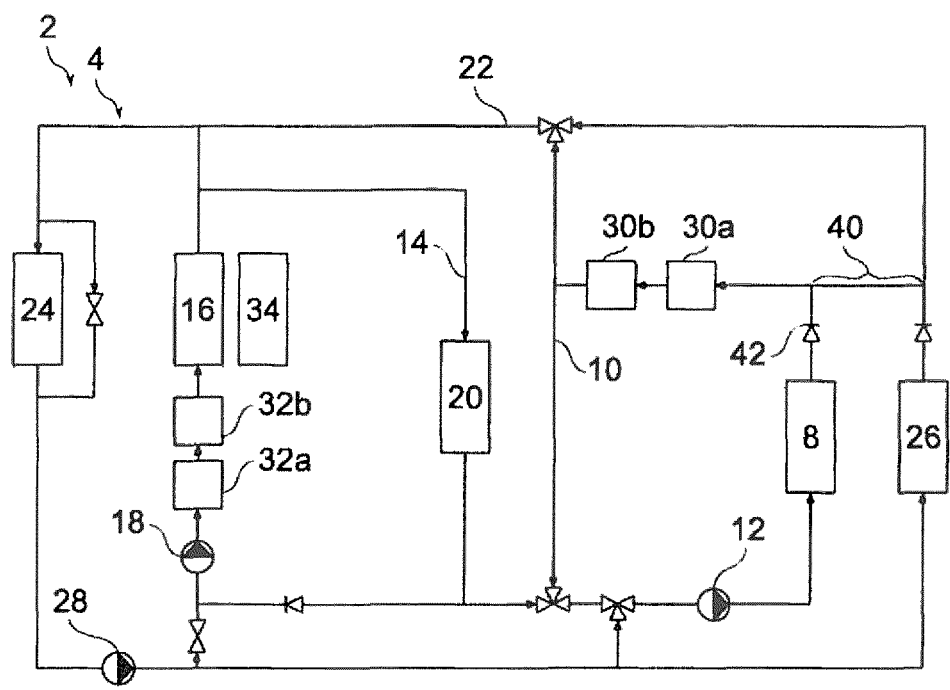
Figure 5:
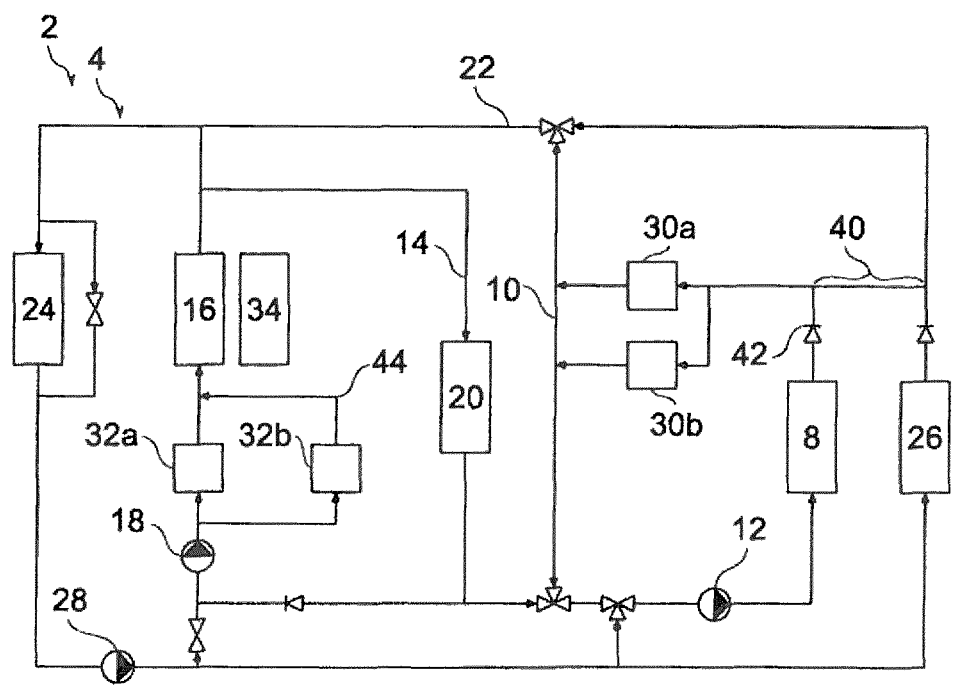

A simple scaling of output in that the condensers 32a, 32b and the chillers 30a, 30b are in each case sequentially connected is shown in FIG. 4. An increase in output in the case of an active first refrigerating circuit 6a is in this instance implemented by additionally switching on the second refrigerating circuit 6b. The situation is similar in FIG. 5, which shows the condensers 32a, 32b, and the chillers 30a, 30b in each case in a true parallel connection. A dummy parallel connection of the condensers 32a, 32b is not required here since the two chillers 30a, 30b in FIG. 5 are used in an equivalent manner, that is to say that, as opposed to the variants of FIGS. 6 and 7, the coolant flow emanating from the heat source 26 reaches both chillers 30a, 30b. In a variant not shown, the serial and parallel connections of FIGS. 4 and 5 are combined, and the chillers 30a, 30b are sequentially connected, and the condensers 32a, 32b are connected in parallel, or vice versa.

Figure 6:
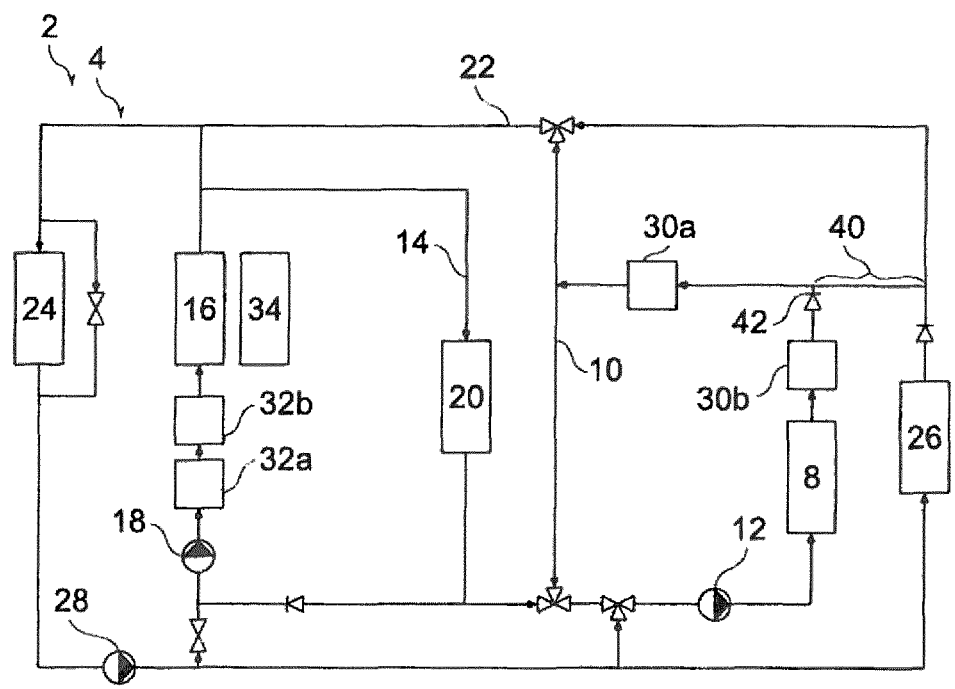
Figure 7:
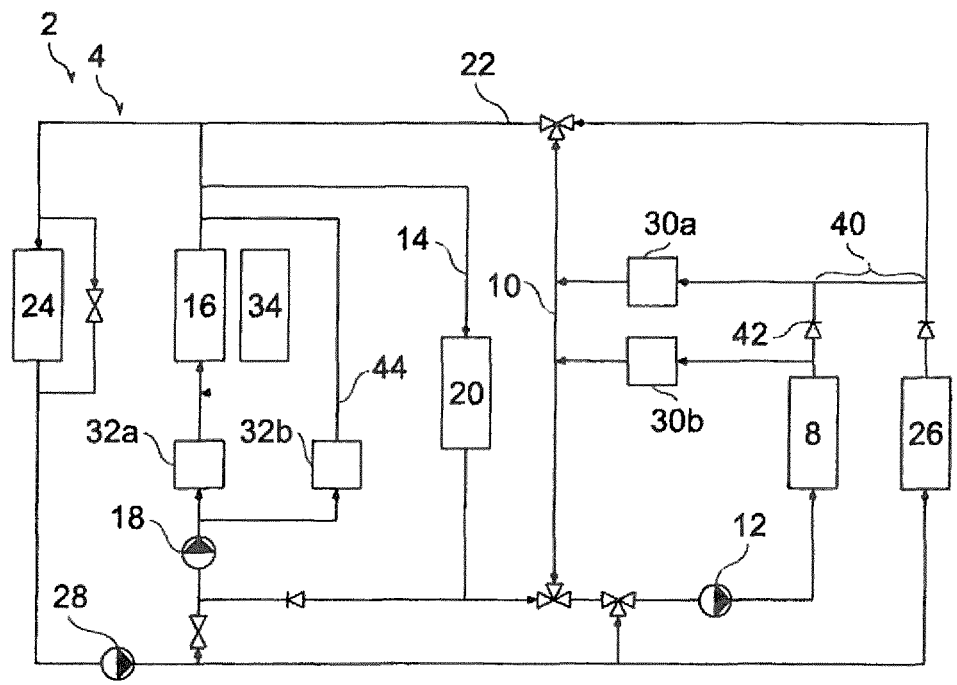
Figure 8A:
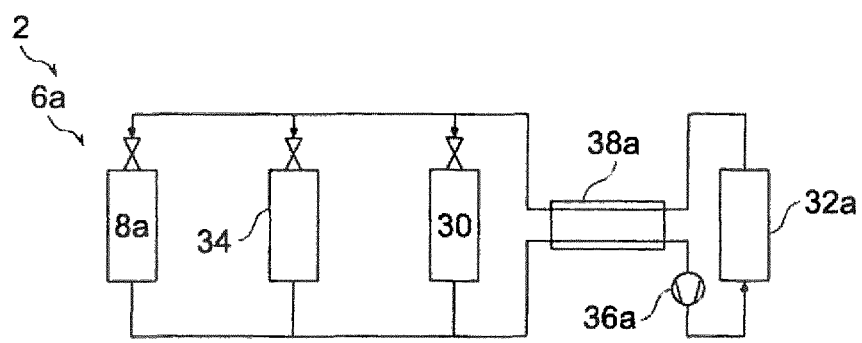
FIGS. 8A, 8B show a first and a second refrigerating circuit, respectively, for a heating system according to FIGS. 1 and 2.
Figure 8B:
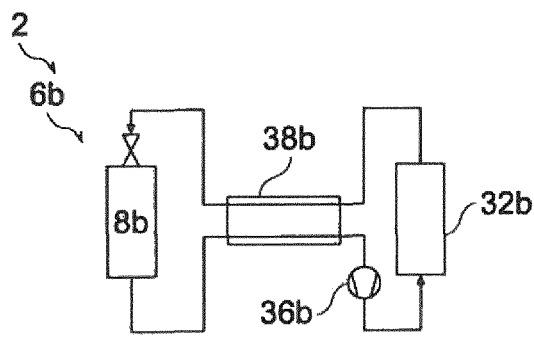

The variants of FIGS. 6 and 7 differ in terms of the positioning of the second chiller 30b, this having corresponding consequences for the second condenser 32b. The positioning relative to the shut-off device 42 is essential herein, said positioning leading to a use of the two chillers 30a, 30b on unequal terms.

The condensers 32a, 32b and the chillers 30a, 30b in FIG. 6 are in each case connected in series. However, by contrast to the variant in FIG. 4, the second chiller 30b in FIG. 6 is disposed upstream and not downstream of the shut-off device 42, such that the second chiller 30b is not used for discharging heat from the heat source 26 but only for cooling the high-voltage accumulator 8. To this extent, a division of labor between the two refrigerating circuits 6a, 6b is performed in such a manner that the second refrigerating circuit 6b is activated only for cooling or for a more intense cooling of the high-voltage accumulator 8. In a variant not shown, the condensers 32a and 32b are disposed in a dummy parallel manner analogous to that of FIG. 7.

The statements made in the context of FIG. 6 apply in an analogous manner also to the variant of FIG. 7 in which the condensers 32a, 32b are disposed in a dummy parallel connection, as are the chillers 30a, 30b, wherein the dummy parallel connection of said chillers 30a, 30b is derived in that the coolant flow downstream of the high-voltage accumulator 8 is split between the two chillers 30a, 30b already ahead of the shut-off device 42, on account of which said two chillers 30a, 30b in the HVA circuit 10 are indeed connected in parallel but in relation to the heat source 26 are not used in an equivalent manner.

In a variant not shown, the condensers 32a and 32b are disposed in series in a manner analogous to that of FIG. 6.

The variants shown in refinements not shown are refined by adding one or a plurality of refrigerating circuits. A further condenser in this instance is expediently likewise installed in the heating circuit 22 and in parallel and/or in series with the two condensers 32a, 32b. The same applies to an optionally additionally disposed chiller.

LIST OF REFERENCE SIGNS

2 Heating system
4 Coolant circuit
6a First refrigerating circuit
6b Second refrigerating circuit
8 High-voltage accumulator
8a, 8b HVA evaporator
10 HVA circuit
12 HVA circuit pump
14 Heating circuit
16 Heating heat exchanger
18 Heating circuit pump
20 Booster heater
22 Cooling circuit
24 Cooler
26 Heat source
28 Cooling circuit pump
30 Chiller
30a First chiller
30b Second chiller
32a First condenser
32b Second condenser
34 Air-conditioning evaporator
36a, 36b Compressor
38a, 38b Internal heat exchanger
40 Cross connection
42 Shut-off device
44 HHE bypass The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A heating system for an electric or hybrid vehicle, to which a high-voltage accumulator is connected, the system comprising:
   a first refrigerating circuit and a coolant circuit, said coolant circuit having a heating circuit, to which a heating heat exchanger is connected, for air-conditioning an interior of the vehicle, and having a cooling circuit to which a cooler and a heat source are connected, wherein the first refrigerating circuit has an air-conditioning evaporator for air-conditioning the interior, and a first condenser, by which the first refrigerating circuit is thermally coupled to the coolant circuit, for discharging heat from the first refrigerating circuit; and
   a separate, second refrigerating circuit which is hydraulically separated from the first refrigerating circuit, which has a second condenser and which by way of the second condenser is thermally coupled to the coolant circuit, for discharging heat from the second refrigerating circuit, wherein
   at least one of the first and second refrigerating circuits has a chiller for discharging heat from the coolant circuit.

2. The heating system as claimed in claim 1, wherein the first and second condensers are connected in parallel and are connected to the heating circuit upstream of the heating heat exchanger.

3. The heating system as claimed in claim 2, wherein a first chiller is connected to the first refrigerating circuit, a second chiller is connected to the second refrigerating circuit, and
   the coolant circuit has an HVA circuit to which the high-voltage accumulator and the first and second chillers are connected, wherein the first and second chillers are disposed downstream of the high-voltage accumulator.

4. The heating system as claimed in claim 1, wherein one of the first and second condensers is connected to the heating circuit upstream of the heating heat exchanger, and the other of the first and second condensers is connected in an HHE bypass, for bypassing the heating heat exchanger.

5. The heating system as claimed in claim 4, wherein a first chiller is connected to the first refrigerating circuit, a second chiller is connected to the second refrigerating circuit, and
   the coolant circuit has an HVA circuit to which the high-voltage accumulator and the first and second chillers are connected, wherein the first and second chillers are disposed downstream of the high-voltage accumulator.

6. The heating system as claimed in claim 1, wherein the first and second condensers are connected in sequence and are connected to the heating circuit upstream of the heating heat exchanger.

7. The heating system as claimed in claim 6, wherein a first chiller is connected to the first refrigerating circuit, a second chiller is connected to the second refrigerating circuit, and
   the coolant circuit has an HVA circuit to which the high-voltage accumulator and the first and second chillers are connected, wherein the first and second chillers are disposed downstream of the high-voltage accumulator.

8. The heating system as claimed in claim 1, wherein the chiller is connected to the first refrigerating circuit, and
   an HVA evaporator is connected to the second refrigerating circuit for cooling the high-voltage accumulator.

9. The heating system as claimed in claim 8, wherein an additional HVA evaporator, which is connected to the first refrigerating circuit, is disposed such that the high-voltage accumulator is connected to both the first and second refrigerating circuits.

10. The heating system as claimed in claim 1, wherein the chiller is connected to the second refrigerating circuit, and
    the coolant circuit has an HVA circuit to which the high-voltage accumulator and the chiller are connected, wherein the chiller is disposed downstream of the high-voltage accumulator.

11. The heating system as claimed in claim 1, wherein a first chiller is connected to the first refrigerating circuit, a second chiller is connected to the second refrigerating circuit, and
    the coolant circuit has an HVA circuit to which the high-voltage accumulator and the first and second chillers are connected, wherein the first and second chillers are disposed downstream of the high-voltage accumulator.

12. The heating system as claimed in claim 11, wherein the first and second chillers are connected in sequence.

13. The heating system as claimed in claim 11, wherein the first and second chillers are connected in parallel.

14. The heating system as claimed in claim 11, wherein one of the first and second chillers is disposed downstream of the high-voltage accumulator as well as downstream of the heat source, and
    the other of the first and second chillers is disposed downstream of the high-voltage accumulator and parallel to the heat source.

15. The heating system as claimed in claim 1, wherein at least one further, separate refrigerating circuit is disposed additionally to the first and second refrigerating circuits, said further refrigerating circuit being separate from the first and second refrigerating circuits and, by way of a further condenser, being thermally connected to the coolant circuit.

16. An electric or hybrid vehicle, comprising:
    a high-voltage accumulator for supplying power to a drivetrain of the vehicle, and
    a heating system as claimed in claim 1, wherein the heating system is configured for air-conditioning the interior as well as for air-conditioning the high-voltage accumulator, and has the first and second refrigerating circuits which are hydraulically separated from one another, and a common coolant circuit, which is thermally coupled to the first and second refrigerating circuits, for exchanging heat with the latter.

17. A method of operating a heating system for an electric or hybrid vehicle, to which a high-voltage accumulator is connected, the heating system comprising:
    a first refrigerating circuit and a coolant circuit, said coolant circuit having a heating circuit, to which a heating heat exchanger is connected, for air-conditioning an interior of the vehicle, and having a cooling circuit to which a cooler and a heat source are connected, wherein the first refrigerating circuit has an air-conditioning evaporator for air-conditioning the interior, and a first condenser, by which the first refrigerating circuit is thermally coupled to the coolant circuit, for discharging heat from the first refrigerating circuit; and a separate, second refrigerating circuit which is hydraulically separated from the first refrigerating circuit, which has a second condenser and which by way of the second condenser is thermally coupled to the coolant circuit, for discharging heat from the second refrigerating circuit, wherein at least one of the first and second refrigerating circuits has a chiller for discharging heat from the coolant circuit, the method of operating the heating system comprising the acts of:

(a) assigning each of the first and second refrigerating circuits a number of air-conditioning tasks having, in each case, one air-conditioning requirement; and (b) activating or deactivating, via a control unit, the first and second refrigerating circuits independently of one another in order for the respective air-conditioning requirement to be met.

\* \* \* \* \*